United States Patent
Gobara

(10) Patent No.: US 7,940,209 B2
(45) Date of Patent: May 10, 2011

(54) PSEUDORANGE CALCULATION METHOD, POSITION CALCULATION METHOD, COMPUTER-READABLE RECORDING MEDIUM, AND POSITION CALCULATION DEVICE

(75) Inventor: Naoki Gobara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 12/417,349

(22) Filed: Apr. 2, 2009

(65) Prior Publication Data

US 2009/0262019 A1 Oct. 22, 2009

(30) Foreign Application Priority Data

Apr. 22, 2008 (JP) .................................. 2008-111154

(51) Int. Cl.
*G01S 19/00* (2010.01)
(52) U.S. Cl. ............ 342/357.2; 342/357.12; 342/357.06
(58) Field of Classification Search ............. 342/357.06, 342/357.12
See application file for complete search history.

(56) References Cited

U.S. PATENT DOCUMENTS

| | | | | |
|---|---|---|---|---|
| 4,578,678 A | * | 3/1986 | Hurd ........................ | 342/357.25 |
| 4,894,662 A | * | 1/1990 | Counselman ............ | 342/357.25 |
| 5,465,413 A | * | 11/1995 | Enge et al. ..................... | 455/307 |
| 5,610,984 A | * | 3/1997 | Lennen ......................... | 380/270 |
| 5,619,212 A | * | 4/1997 | Counselman, III ...... | 342/357.26 |
| 5,805,200 A | * | 9/1998 | Counselman, III ...... | 342/357.26 |
| 5,808,581 A | * | 9/1998 | Braisted et al. .......... | 342/357.58 |
| 5,828,336 A | * | 10/1998 | Yunck et al. ............. | 342/357.31 |
| 6,078,290 A | * | 6/2000 | McBurney et al. ............ | 342/417 |
| 7,400,974 B2 | * | 7/2008 | Fuchs et al. ................... | 701/213 |
| 2008/0100509 A1 | * | 5/2008 | Kimura .................... | 342/357.12 |
| 2009/0262020 A1 | * | 10/2009 | Kimura .................... | 342/357.12 |

FOREIGN PATENT DOCUMENTS

JP H11-258326 A 9/1999

* cited by examiner

*Primary Examiner* — Thomas H Tarcza
*Assistant Examiner* — Frank McGue
(74) *Attorney, Agent, or Firm* — Global IP Counselors, LLP

(57) ABSTRACT

A pseudorange calculation method for calculating a pseudorange in a position calculation device includes: passing a received signal received from a satellite for position calculation through a first filter; passing the received signal through a second filter having a different phase characteristic from that of the first filter; calculating a first pseudorange on the basis of a signal acquired by passing through the first filter; calculating a second pseudorange on the basis of a signal acquired by passing through the second filter; and calculating a third pseudorange to be used for position calculation, on the basis of the first pseudorange and the second pseudorange.

7 Claims, 13 Drawing Sheets

252,253

| CAPTURE SATELLITE | MEASUREMENT INFORMATION ||
| --- | --- | --- |
| | FREQUENCY | CODE PHASE |
| S1 | F1 | CP1 |
| S3 | F3 | CP3 |
| S6 | F6 | CP6 |
| ⋮ | ⋮ | ⋮ |

| CAPTURE SATELLITE | AVERAGE CODE PHASE |
| --- | --- |
| S1 | ACP1 |
| S3 | ACP3 |
| S6 | ACP6 |
| ⋮ | ⋮ |

| FIRST FILTER | SECOND FILTER | $k_1$ | $k_2$ | $\Delta CP$ |
|---|---|---|---|---|
| HIGH SENSITIVITY | HIGH ACCURACY | a1 | a2 | $\Delta CP1$ |
| HIGH SENSITIVITY | HIGH SENSITIVITY | b1 | b2 | $\Delta CP2$ |
| HIGH ACCURACY | HIGH ACCURACY | c1 | c3 | $\Delta CP3$ |
| SUPERSENSITIVITY | SUPERHIGH ACCURACY | d1 | d2 | $\Delta CP4$ |
| . . . | . . . | . . . | . . . | . . . |

FIG.16 as disclosed in JP-A-11-258326.

PSEUDORANGE CALCULATION METHOD, POSITION CALCULATION METHOD, COMPUTER-READABLE RECORDING MEDIUM, AND POSITION CALCULATION DEVICE

This application claims priority to JP 2008-111154 filed in Japan on Apr. 22, 2008, the disclosure of which is hereby incorporated by reference in its entirety.

BACKGROUND

1. Technical Field

The present invention relates to a pseudorange calculation method, a position calculation method, a computer-readable recording medium, and a position calculation device.

2. Related Art

The GPS (Global Positioning System) is widely known as a positioning system utilizing artificial satellites and is used for positioning devices built in portable telephones, car navigation devices and so on. In the GPS, positioning operation is carried out in which the values of four parameters, that is, three-dimensional coordinate values indicating the position of a user's machine and a timer error, are found on the basis of information including the positions of plural GPS satellites and the pseudorange from each GPS satellite to the user's machine. Thus, the current position of the user's machine is measured.

GPS satellite signals sent from GPS satellites are modulated by a spread code called PRN code, which is different from one GPS satellite to another. It is known that the PRN code has its polarity inverted at intervals of 20 milliseconds by phase modulation based on navigation data, for example, as disclosed in JP-A-11-258326.

To extract and capture a GPS satellite signal from a received RF signal, the received signal (or a signal after conversion to an intermediate frequency signal) is filtered so that an unnecessary frequency component is removed and reception sensitivity is thus improved. Particularly, since a GPS satellite signal is sent with a prescribed frequency, the pass band of the filter may be narrowed to extract only the vicinity of this frequency (or the frequency of the GPS satellite signal in the case where the received signal is converted to an intermediate frequency signal), thus improving reception sensitivity.

However, even if the frequency of a signal sent from a GPS satellite is a prescribed frequency at the time of sending, the frequency of the signal received by a GPS receiver is not the prescribed GPS frequency provided at the time of sending because of Doppler shift due to Earth orbiting of the GPS satellite, the influence caused when the signal passes through the ionosphere and the atmosphere, the influence of multipath and so on. Therefore, if the pass band of the filter is made too narrow, the GPS satellite signal modulated by spread spectrum modulation is partly lost, causing a problem of lowered positioning accuracy. Of course, other satellite positioning systems than the GPS have similar problems.

SUMMARY

An advantage of some aspects of the invention is that a new technique for improving positioning accuracy can be provided.

According to an aspect of the invention, a pseudorange calculation method for calculating a pseudorange in a position calculation device includes: passing a received signal received from a satellite for position calculation through a first filter; passing the received signal through a second filter having a different phase characteristic from that of the first filter; calculating a first pseudorange on the basis of a signal acquired by passing through the first filter; calculating a second pseudorange on the basis of a signal acquired by passing through the second filter; and calculating a third pseudorange to be used for position calculation, on the basis of the first pseudorange and the second pseudorange.

According to another aspect of the invention, a position calculation device includes: a receiving unit which receives a position calculation signal from a satellite for position calculation; a first filter which passes a signal having a first frequency band of the received signal; a second filter which has a different phase characteristic from that of the first filter and passes a signal having a second frequency band of the received signal; a calculation unit which calculates a third pseudorange on the basis of a first pseudorange calculated on the basis of a signal acquired by passing through the first filter and a second pseudorange calculated on the basis of a signal acquired by passing through the second filter; and a position calculation unit which executes position calculation using the third pseudorange.

According to these aspects, a received signal of a position calculation signal sent from the satellite for position calculation is passed through each of plural filters having different phase characteristics. Then, a pseudorange is calculated on the basis of each signal acquired by passing through each filter and a pseudorange to be used for positioning operation is calculated on the basis of calculated plural pseudoranges.

The phase characteristic of a filter (a characteristic representing a phase change between a signal before passing through the filter and the signal after passing through the filter) causes a phase lag in the received signal passed through the filter. Therefore, as the received signal is passed through plural filters having different phase characteristics, plural signals having a phase shift can be acquired. If each of the plural signals is sampled with a predetermined sampling frequency, plural sampling data which appear to have been sampled in different timings can be acquired because of the phase shift. As a pseudorange is calculated by using these sampling data, an effect equivalent to sampling with an increased sampling frequency can be achieved. Thus, a highly accurate pseudorange can be acquired. If the pseudorange thus acquired is used to perform positioning operation, positioning accuracy is improved.

It is preferable that in the pseudorange calculation method, a pass band of the first filter includes a pass band of the second filter.

It is also preferable that in the pseudorange calculation method, calculating the third pseudorange includes changing a weight of the first pseudorange and a weight of the second pseudorange on the basis of a difference between a pass band of the first filter and a pass band of the second filter, and carrying out weighted average operation of the first pseudorange and the second pseudorange.

According to this, the weight of the first pseudorange and the weight of the second pseudorange are changed on the basis of the difference between the pass band of the first filter and the pass band of the second filter, thereby carrying out weighted average operation. For example, to seek high reception sensitivity, the weight of the pseudorange calculated on the basis of the signal passed through the filter having the narrower pass band is set to be high. To seek high positioning accuracy, the weight of the pseudorange calculated on the basis of the signal passed through the filter having the broader pass band is set to be high. Thus, appropriate pseudorange calculation according to purposes can be realized.

It is also preferable that in the pseudorange calculation method, calculating the third pseudorange includes changing the weight of the first pseudorange and the weight of the second pseudorange in such a manner that the weight of the first pseudorange becomes greater than the weight of the second pseudorange as the difference between the pass band of the first filter and the pass band of the second filter becomes greater.

According to this, the weights are changed in such a manner that the weight of the pseudorange corresponding to the filter having the broader pass band becomes greater than the weight of the pseudorange corresponding to the filter having the narrower pass band as the difference between the pass band of the first filter and the pass band of the second filter becomes greater. That is, as the difference between the pass bands of the two filters becomes greater, positioning accuracy is emphasized in calculating the pseudorange.

It is also preferable that the pseudorange calculation method according to the first aspect further includes variably setting pass bands of the first filter and the second filter.

According to this, the pass bands of the first filter and the second filter can be variably set.

According to another aspect of the invention, a position calculation method carries out position calculation using a pseudorange calculated by the pseudorange calculation method. According to still another aspect of the invention, a computer-readable recording medium including a program recorded therein for causing a computer provided in a position calculation device to execute the pseudorange calculation method.

BRIEF DESCRIPTION OF THE DRAWINGS

The invention will be described with reference to the accompanying drawings, wherein like numbers reference like elements.

FIG. 4 shows an exemplary data configuration of high sensitivity-type data and high accuracy-type data.

FIG. 5 shows an exemplary data configuration of average code phase data by capture satellite.

FIG. 16 shows the correspondence between the application of a filter, the weight of a code phase, and offset of the code phase.

DESCRIPTION OF EXEMPLARY EMBODIMENTS

Hereinafter, a preferred embodiment of the invention will be described with reference to the drawings. In the following description, a portable telephone unit is used as an exemplary electronic device having a positioning device, and the GPS (Global Positioning System) is used as a positioning system. However, embodiments to which the invention can apply are not limited to this.

1. Functional Configuration

Figure 1:
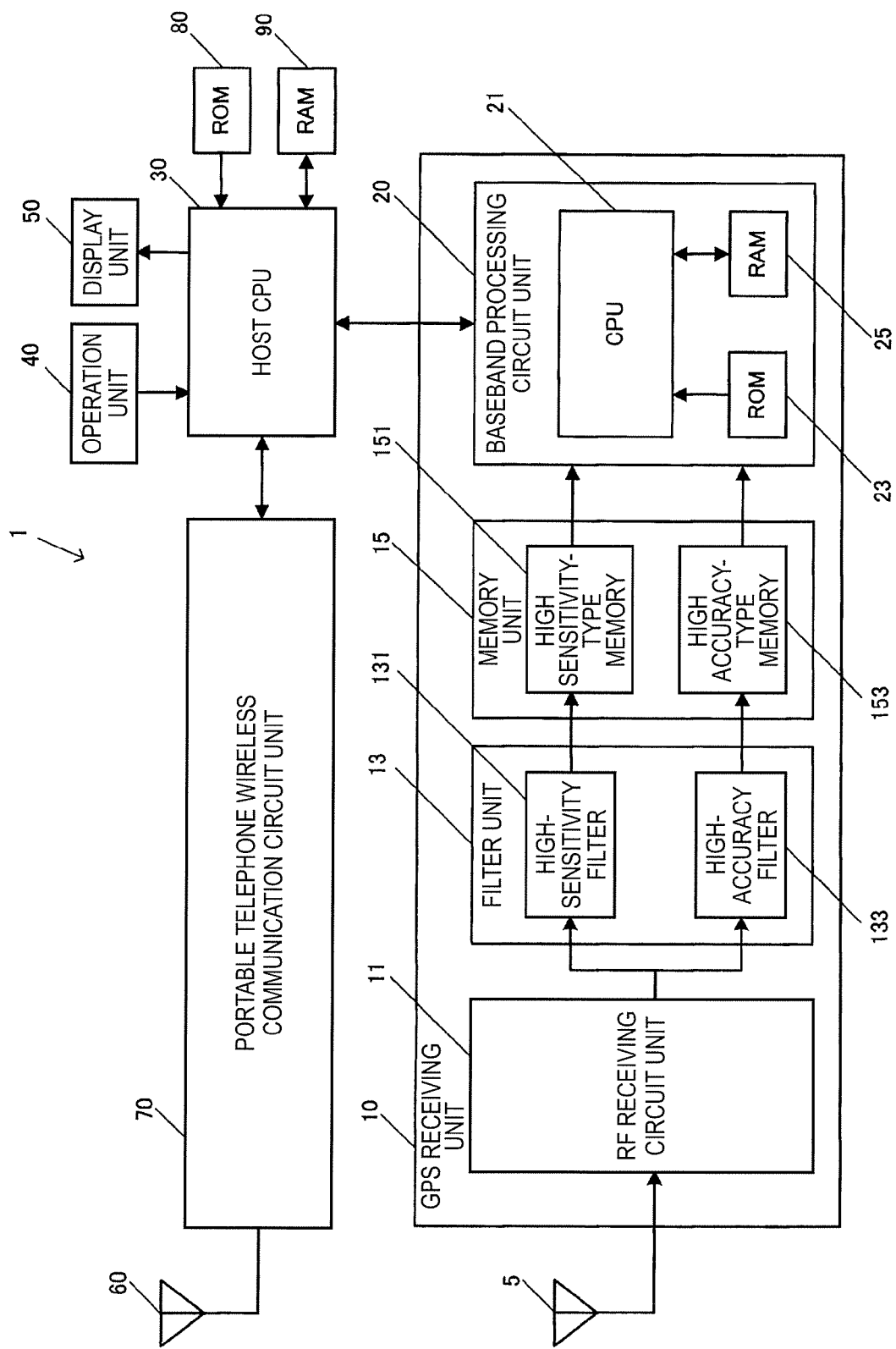
FIG. 1 is a block diagram showing the functional configuration of a portable telephone unit.

FIG. 1 is a block diagram showing the functional configuration of a portable telephone unit 1 according to this embodiment. The portable telephone unit 1 has a GPS antenna 5, a GPS receiving unit 10, a host CPU (central processing unit) 30, an operation unit 40, a display unit 50, a portable telephone antenna 60, a portable telephone wireless communication circuit unit 70, a ROM (read only memory) 80, and a RAM (random access memory) 90.

The GPS antenna 5 is an antenna which receives RF (radio frequency) signals including GPS satellite signals sent from GPS satellites. The GPS antenna 5 outputs the received signals to the GPS receiving unit 10. A GPS satellite signal is a communication signal of 1.57542 [GHz] that is directly modulated by a spread spectrum system with a PRN (pseudo random noise) code, which is a type of spread code different from one satellite to another. A PRN code is a pseudo random noise code with a cycle period of 1 ms using a code length of 1023 chips as one PN frame.

The GPS receiving unit 10 is a positioning circuit which measures the current position of the portable telephone unit 1 on the basis of a signal outputted from the GPS antenna 5. The GPS receiving unit 10 is a functional block equivalent to a so-called GPS receiver. The GPS receiving unit 10 has an RF receiving circuit unit 11, a filter unit 13, a memory unit 15, and a baseband processing circuit unit 20.

The RF receiving circuit unit 11 and the baseband processing circuit unit 20 can be produced as separate LSIs (large scale integrations) or can be produced as one chip. Moreover, the entire GPS receiving unit 10 including the filter unit 13 and the memory unit 15 can be produced as one chip.

The RF receiving circuit unit 11 is a processing circuit block for RF signals and generates an oscillation signal for RF signal multiplication by dividing or multiplying a predetermined local oscillation signal. The RF receiving circuit unit 11 multiplies an RF signal outputted from the GPS antenna 5 by the generated oscillation signal and thereby down-converts the RF signal to a signal having an intermediate frequency (hereinafter, referred to as "IF (intermediate frequency) signal"). After amplification or the like of the IF signal, the RF receiving circuit unit 11 converts the IF signal to a digital signal by an A/D converter and outputs the digital signal to the filter unit 13.

The filter unit 13 is a circuit including plural low-pass filters which pass frequency band components equal to and lower than a predetermined cutoff frequency, of the IF signal outputted from the RF receiving circuit unit 11. The filter unit 13 includes two filters, that is, a high-sensitivity filter 131 and a high-accuracy filter 133.

The high-sensitivity filter 131 has a cutoff frequency of, for example, 300 [kHz] and attenuates frequency band components exceeding 300 [kHz] of the IF signal. Meanwhile, the high-accuracy filter 133 has a cutoff frequency of, for example, 600 [kHz] and attenuates frequency band components exceeding 600 [kHz] of the IF signal. That is, the high-accuracy filter 133 has a broader band than the high-sensitivity filter 131.

The signal passed through the high-sensitivity filter 131 has high-frequency components removed and thus has noise components removed, compared to the signal passed through the high-accuracy filter 133. On the other hand, the signal passed through the high-accuracy filter 133 has less lack of information because the high-accuracy filter 133 passes signals of higher bands than the high-sensitivity filter 131.

Also, a phase lag is generated in the signal passed through each filter because of the phase characteristic of the filter. That is, there is a phase shift between a signal inputted to the filter and a signal passed through the filter. In this case, because of the difference between the pass band of the high-sensitivity filter 131 and the pass band of the high-accuracy filter 133, a greater phase lag is occurs in the signal passed through the high-sensitivity filter 131 than in the signal passed through the high-accuracy filter 133.

The memory unit 15 includes plural storage areas in which the signal passed through the filter unit 13 is sampled with a predetermined sampling frequency (sampling rate) and then stored. The memory unit 15 has a high sensitivity-type memory 151 which stores sampling data of the signal passed through the high-sensitivity filter 131, and a high accuracy-type memory 153 which stores sampling data of the signal passed through the high-accuracy filter 133.

Each of the high sensitivity-type memory 151 and the high accuracy-type memory 153 has a memory capacity to store sampling data for, for example, 10 milliseconds. The memory capacity may be properly designed in accordance with the integration time at the time of correlation operation with respect to sampling data.

In the following description, a signal passed through the high-sensitivity filter 131 and the high sensitivity-type memory 151 is referred to as a "high sensitivity-type signal", and a signal passed through the high-accuracy filter 133 and the high accuracy-type memory 153 is referred to as a "high accuracy-type signal".

The baseband processing circuit unit 20 is a circuit unit which carries out correlation processing or the like to the sampling data stored in the memory unit 15, thereby captures and extracts a GPS satellite signal, decodes data, takes out a navigation message, time information and so on, and carries out positioning operation. The baseband processing circuit unit 20 includes a CPU 21 as its processor, and a ROM 23 and a RAM 25 as its memories.

The host CPU 30 is a processor which comprehensively controls each part of the portable telephone unit 1 in accordance with various programs such as a system program and so on stored in the ROM 80. The host CPU 30 causes the display unit 50 to display a navigation screen which plots an output position inputted from the CPU 21.

The operation unit 40 is an input device including, for example, a touch panel and button switches. The operation unit 40 outputs a signal of a pressed icon or button to the host CPU 30. With the operation of this operation unit 40, various instructions are inputted including a communication request, an email transmission and reception request, and a GPS start request.

The display unit 50 is a display device which includes an LCD (liquid crystal display) or the like and performs various displays based on display signals inputted from the host CPU 30. A navigation screen, time information and so on are displayed on the display unit 50.

The portable telephone antenna 60 is an antenna which transmits and receives portable telephone wireless signals and various data to and from a wireless base station installed by the communication service provider of the portable telephone unit 1.

The portable telephone wireless communication circuit unit 70 is a communication circuit unit for portable telephone including an RF conversion circuit, a baseband processing circuit and so on. The portable telephone wireless communication circuit unit 70 modulates and demodulates portable telephone wireless signals and thereby realizes transmission and reception of calls and emails.

The ROM 80 is a read-only non-volatile memory device and stores a system program for the host CPU 30 to control the portable telephone unit 1 and various programs and data for realizing navigation functions.

The RAM 90 is a readable and writable volatile memory device and forms a work area which temporarily stores the system program executed by the host CPU 30, various processing programs, in-process data of various processing, processing results and so on.

2. Data Configuration

Figure 2:
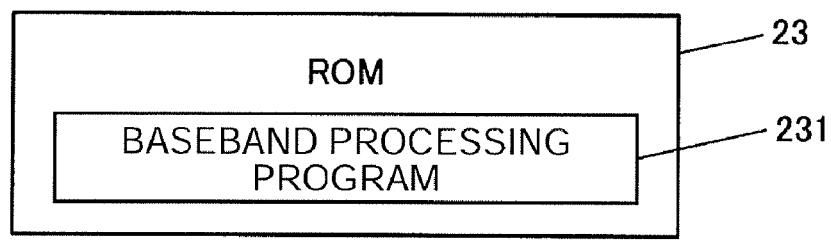
FIG. 2 shows an example of data stored in a ROM of a baseband processing circuit unit.

FIG. 2 shows an example of data stored in the ROM 23 of the baseband processing circuit unit 20. The ROM 23 stores a baseband processing program 231 which is read out by the CPU 21 and executed as baseband processing (see FIG. 6).

Baseband processing refers to processing in which for each of GPS satellites as capture targets (hereinafter referred to as "capture target satellites"), the CPU 21 calculates the pseudorange between the capture target satellite and the portable telephone unit 1 on the basis of the result of correlation operation with respect to a high sensitivity-type signal and the result of correlation operation with respect to a high accuracy-type signal, and performs predetermined positioning operation using the pseudorange, thereby measuring the current position of the portable telephone unit 1.

Here, the correlation operation is realized by correlation processing in which the correlation value between sampling data stored in the memory unit 15 and a replica code is calculated, for example, by using FFT (Fast Fourier Transform) operation. A replica code is a signal imitating a PRN code included in a satellite signal of a capture target satellite which is generated simulatively.

The CPU 21 carries out the above correlation processing while changing the frequency of the generated signal of the replica code and the phase of the replica code. If the frequency of the generated signal of the replica code coincides with the frequency of the received signal, and the phase of the replica code coincides with the phase of the PRN code of the received signal, the correlation values is at its maximum.

More specifically, a predetermined frequency and phase range corresponding to the GPS satellite signal of the capture target are set as a search range. In this search range, correlation operation in the direction of phase to detect the start position of the PRN code (code phase) and correlation operation in the direction of frequency to detect the frequency are carried out. For frequency, the search range is defined within a predetermined frequency sweep range around the carrier frequency of the GPS satellite signal, 1.57542 [GHz], as its center. For phase, the search range is defined within a phase range of 1023 chips, which is the chip length of the PRN code.

Since the GPS satellite signal is repeatedly modulated by the PRN code, it can be conceptually considered that the PRN codes are continuously arrayed between the GPS satellite and the portable telephone unit 1. However, the distance from the GPS satellite to the portable telephone unit 1 is not necessary an integral multiple of the length of the PRN code, and a fraction may occur. In correlation operation, the code length equivalent to this factional part is detected as the code phase of the PRN code. In this case, the length obtained by adding the fractional part to an integral multiple of the length of the PRN code is the pseudorange between the GPS satellite and the portable telephone unit 1.

The CPU 21 calculates the average value of the code phase obtained as a result of correlation operation with respect to the high sensitivity-type signal and the code phase obtained as a result of correlation operation with respect to the high accuracy-type signal, and defines the result of this calculation as an average code phase. Using this average code phase, the CPU 21 then calculates the pseudorange used for positioning operation. The calculation of the average value in this embodiment uses the arithmetic mean, which is simple.

However, this is not simply averaging the code phase obtained as a result of correlation operation with respect to the high accuracy-type signal and the code phase obtained as a result of correlation operation with respect to the high sensitivity-type signal, because the phase characteristics of the filters are different. The difference between the phase characteristics of the filters causes a temporal shift between the high accuracy-type signal and the high sensitivity-type signal.

Thus, an offset of the code phase based on the difference between the phase characteristics of the filters is predefined, and averaging is carried out by using a code phase that is offset-adjusted on the basis of the offset. Specifically, the average code phase "CP" is calculated in accordance with the following equation (1), where "$CP_A$" represents the code phase calculated from the high accuracy-type signal, "$CP_S$" represents the code phase calculated from the high sensitivity-type signal, and "$\Delta CP$" represents the offset of the code phase.

$$CP=(CP_A+(CP_S-\Delta CP))/2 \quad (1)$$

Calculating the pseudorange by using the average code phase is equivalent to calculating the average value of the pseudorange calculated on the basis of the code phase obtained for the high sensitivity-type signal and the pseudorange calculated on the basis of the code phase obtained for the high accuracy-type signal. Alternatively, depending on the required accuracy, processing to find a simple average value may be used as averaging processing instead of the averaging using the equation (1).

Figure 3:
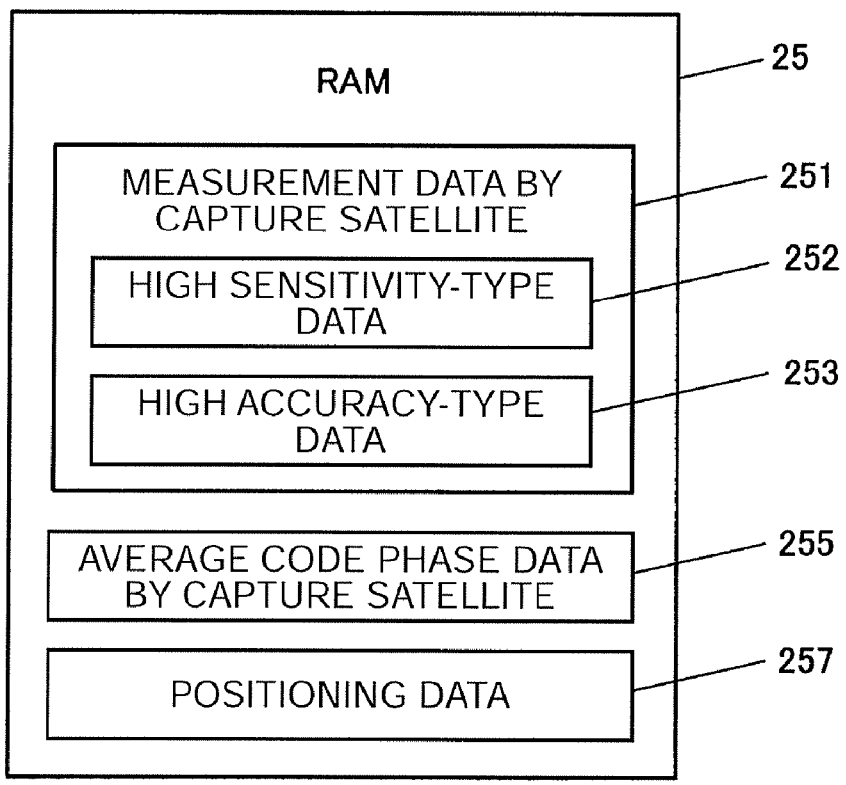
FIG. 3 shows an example of data stored in a RAM of a baseband processing circuit unit.

FIG. 3 shows an example of data stored in the RAM 25 of the baseband processing circuit unit 20. The RAM 25 stores measurement data by capture satellite 251, average code phase data by capture satellite 255, and positioning data 257.

The measurement data by capture satellite 251 is data of information of the frequency and code phase obtained as a result of correlation operation (hereinafter referred to as "measurement information" in this embodiment), and includes high sensitivity-type data 252, which is data of measurement information obtained for the high sensitivity-type signal, and high accuracy-type data 253, which is data of measurement information obtained for the high accuracy-type signal.

FIG. 4 shows an exemplary data configuration of the high sensitivity-type data 252 and the high accuracy-type data 253. In the high sensitivity-type data 252 and the high accuracy-type data 253, information of frequency and code phase is stored in association with measurement information 2523 and 2533, for each of capture satellites 2521 and 2531. The high sensitivity-type data 252 and the high accuracy-type data 253 are updated by the CPU 21 in baseband processing.

FIG. 5 shows an exemplary data configuration of the average code phase data by capture satellite 255. In the average code phase data by capture satellite 255, data of the average value of the code phase stored in the high sensitivity-type data 252 and the code phase stored in the high accuracy-type data 253 is stored for each of capture satellites 2551. The average code phase data by capture satellite 255 is updated by the CPU 21 in baseband processing.

The positioning data 257 is data about the measured position calculated by positioning operation and is updated by the CPU 21 in baseband processing.

3. Flow of Processing

Figure 6:
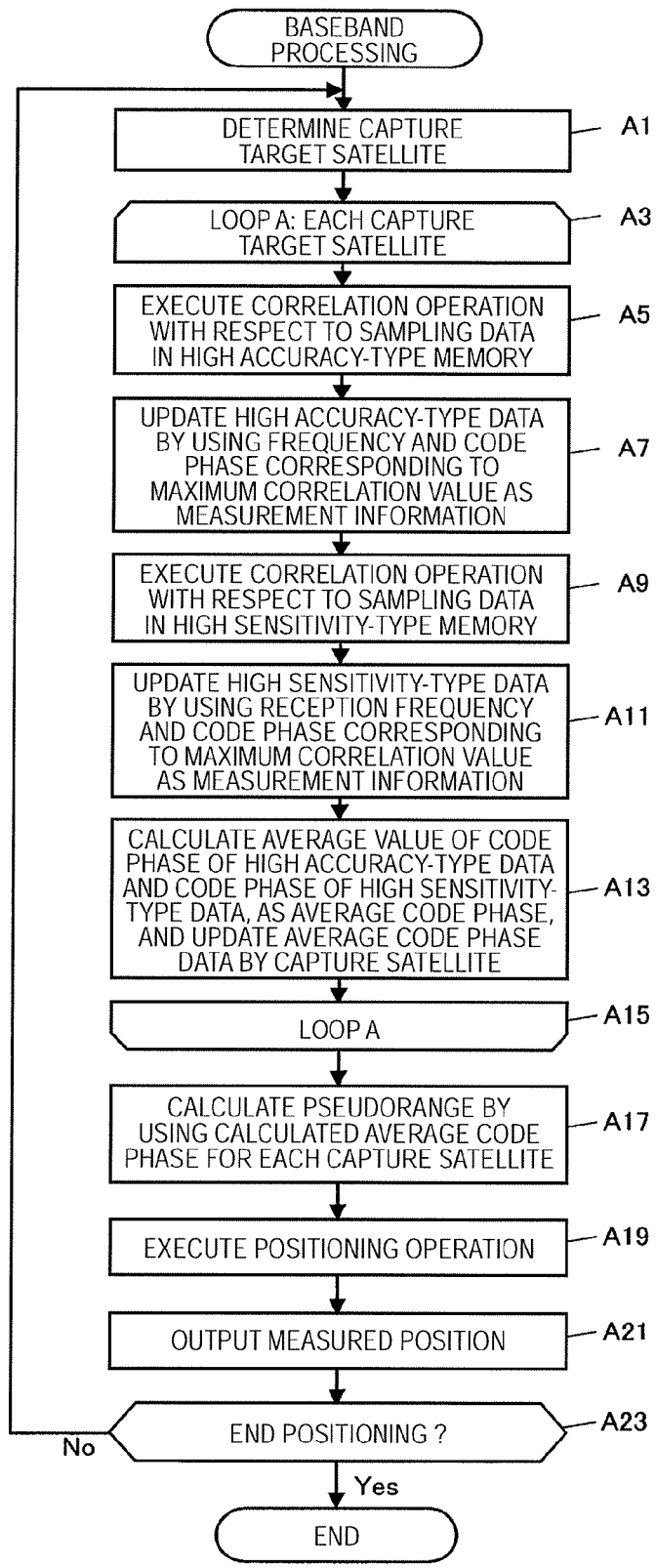
FIG. 6 is a flowchart showing a flow of baseband processing.

FIG. 6 is a flowchart showing the flow of baseband processing executed in the portable telephone unit 1 as the baseband processing program 231 stored in the ROM 23 is read out and executed by the CPU 21.

Baseband processing is a process which the CPU 21 starts executing when it is detected that an operation to give a positioning start instruction is carried out on the operation unit 40, along with the reception of a GPS satellite signal by the RF receiving circuit unit 11. This baseband processing is carried out parallel to various kinds of processing such as execution of various applications. The on and off operation of the power source of the portable telephone unit 1 and the start and stop operation of the GPS may be interlocked with each other so that the execution of baseband processing is started when the on operation of the power source of the portable telephone unit 1 is detected.

First, the CPU 21 determines a GPS satellite to be a capture target (hereinafter referred to as "capture target satellite") on the basis of the latest almanac data or the like (step A1). More specifically, the CPU 21 determines the GPS satellite located up in the air above a predetermined provisional current position on the basis of almanac or ephemeris data at the current time measured by a timer unit (not shown). The provisional current position is provided, for example, as the position of a communication base station of the portable telephone unit or the previously measured position. The CPU 21 then executes processing of a loop A for each capture target satellite (steps A3 to A15).

In the loop A, the CPU 21 executes correlation operation with respect to sampling data stored in the high accuracy-type memory 153 (step A5). The CPU 21 then stores and updates the frequency and code phase corresponding to the maximum correlation value to the high accuracy-type data 253 in the RAM 25 as the measurement information 2533 (step A7).

Similarly, executes correlation operation with respect to sampling data stored in the high sensitivity-type memory 151 (step A9). The CPU 21 then stores and updates the frequency and code phase corresponding to the maximum correlation value to the high sensitivity-type data 252 in the RAM 25 as the measurement information 2523 (step A11).

Next, the CPU 21 calculates the average value of the code phase of the present capture target satellite stored in the high accuracy-type data 253 and the code phase of the present capture target satellite stored in the high sensitivity-type data 252 in accordance with the equation (1), defines the calculated average value as an average code phase, and updates the average code phase data by capture satellite 255 in the RAM 25 (step A13). The CPU 21 then shifts the processing to the next capture target satellite.

After carrying out the processing of steps A5 to A13 on all the capture target satellites, the CPU 21 ends the loop A (step A15). After ending the loop A, the CPU 21 calculates, for each capture satellite, the pseudorange between the capture satellite and the portable telephone unit 1 by using the average code phase stored in the average code phase data by capture satellite 255 (step A17).

The CPU 21 then carries out predetermined positioning operation using the pseudorange calculated in step A17 and thereby measures the current position of the portable telephone unit 1 (step A19). As the positioning operation, known techniques such as positioning operation using the least square method and positioning operation using the Kalman filtering can be employed.

After that, the CPU 21 outputs the measured position found by the positioning operation to the host CPU 30 (step A21). The CPU 21 then determines whether to end the positioning or not (step A23). If the CPU 21 determines not to end the positioning (No in step A23), the processing returns to step A1. If the CPU 21 determines to end the positioning (Yes in step A23), the CPU 21 end the baseband processing.

4. Results of Experiment

Figure 7:
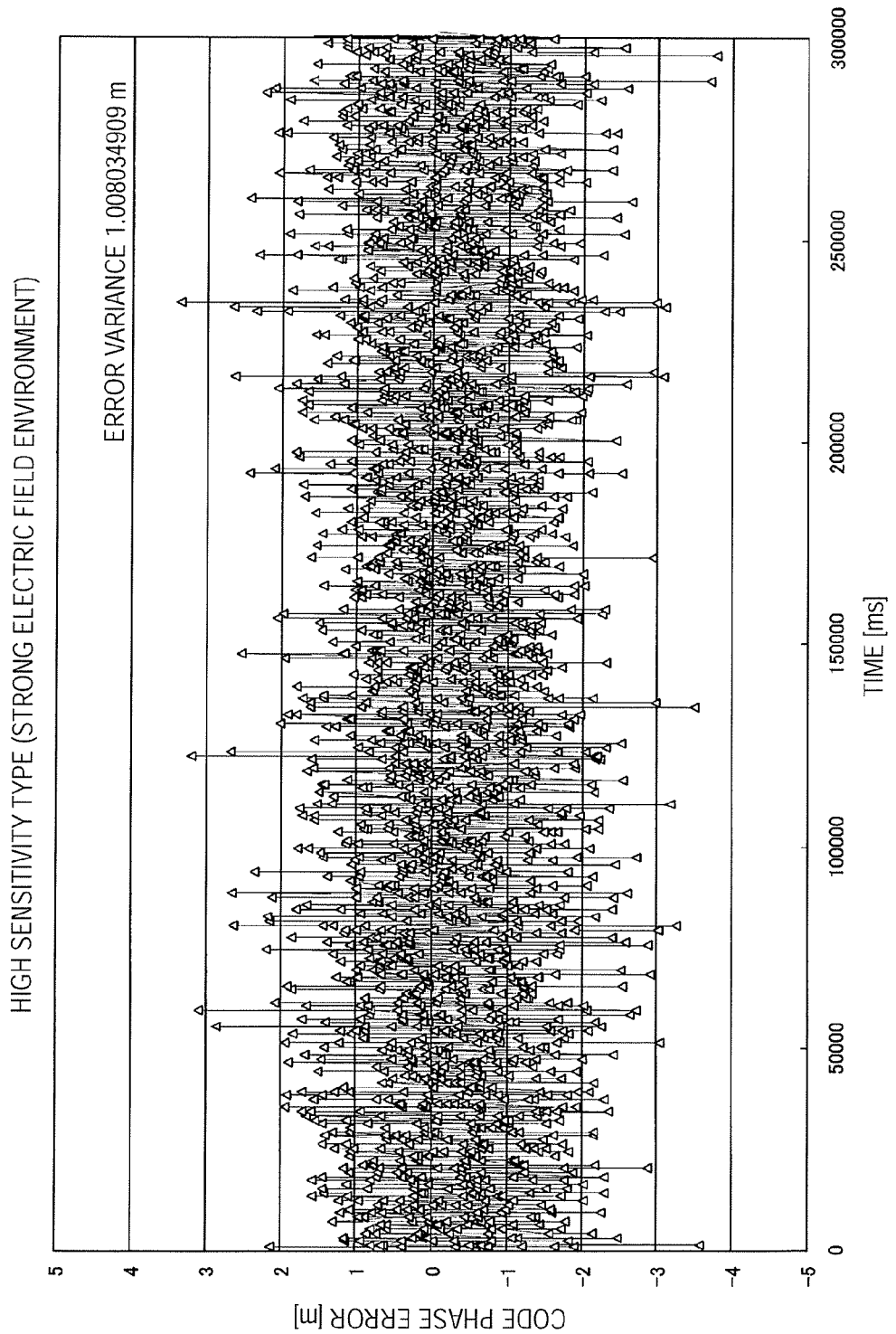
FIG. 7 shows an exemplary result of experiment in a strong electric field environment.
Figure 8:
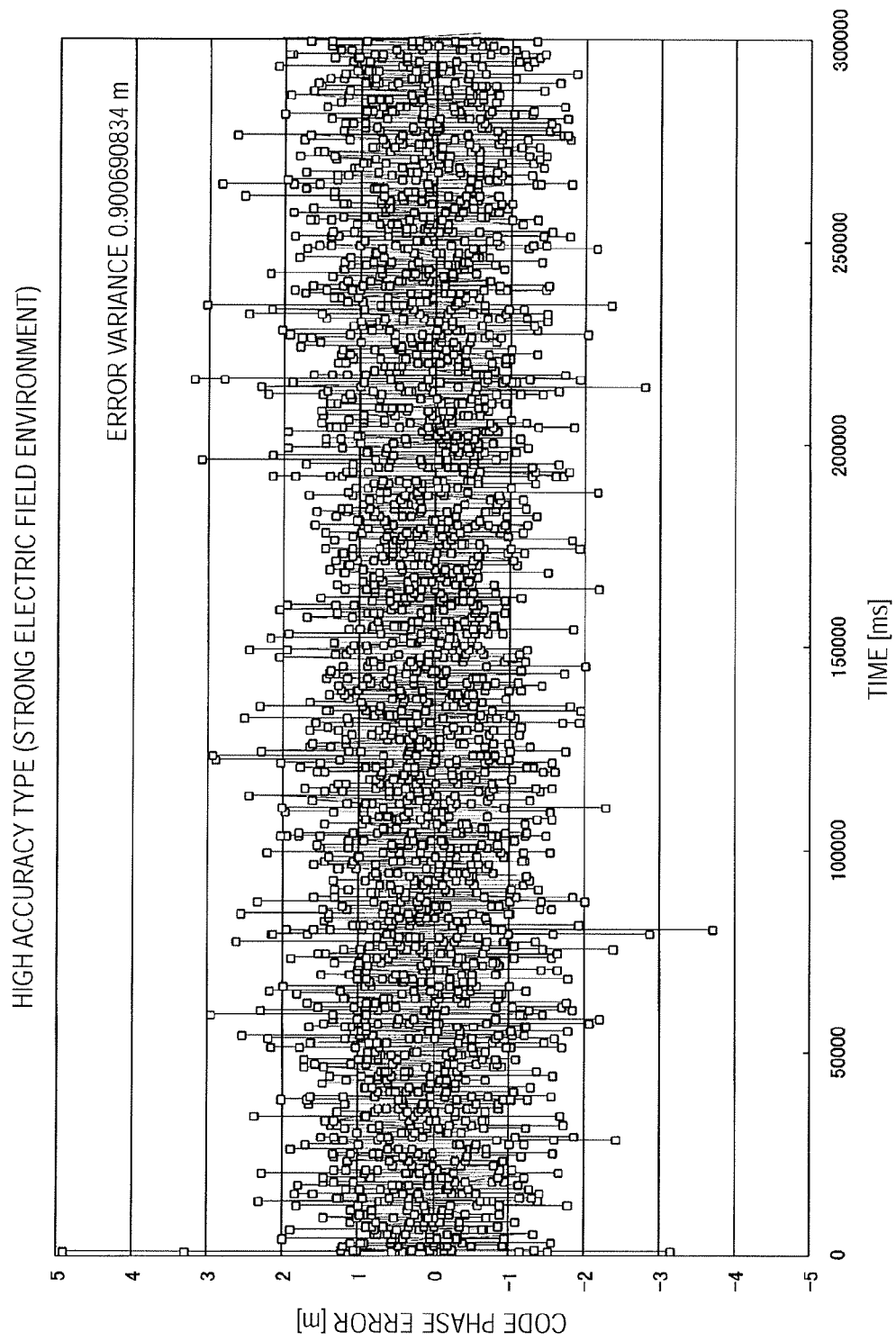
FIG. 8 shows an exemplary result of experiment in a strong electric field environment.
Figure 9:
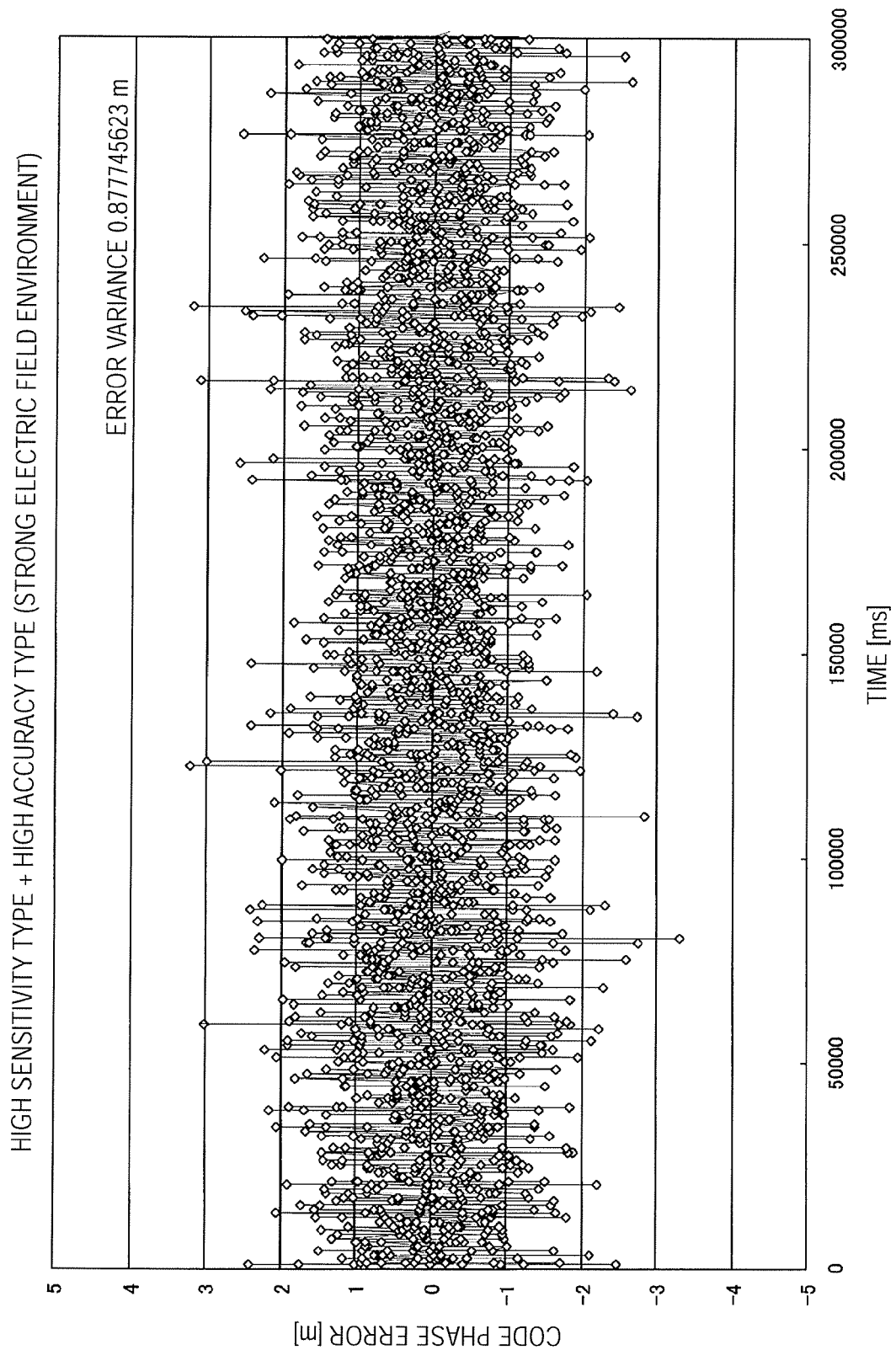
FIG. 9 shows an exemplary result of experiment in a strong electric field environment.

FIG. 7 to FIG. 9 show exemplary results of experiments in an environment where a GPS satellite signal can be received as a signal of a strong electric field (hereinafter referred to as "strong electric field environment") such as a so-called open sky environment. FIG. 7 to FIG. 9 show graphs plotting the magnitude of an error in measured value of a code phase where the horizontal axis represents the lapse of time for measurement and where one particular GPS satellite is focused on and the true value of the code phase of a GPS satellite signal received from this GPS satellite is used as a reference.

FIG. 7 is a graph plotting the magnitude of an error in a code phase calculated with respect to a high sensitivity-type signal according to the traditional technique. FIG. 8 is a graph plotting the magnitude of an error in a code phase calculated with respect to a high accuracy-type signal according to the traditional technique. FIG. 9 is a graph plotting the magnitude of an error in an average code phase calculated with respect to a high sensitivity-type signal and a high accuracy-type signal according to the technique of this embodiment. In each of these drawings, the horizontal axis represents time [ms] and the vertical axis represents error [m].

From the results of these, it can be understood that the distribution of errors in the average code phase calculated according to the technique of this embodiment is concentrated around the error "0". It can also be seen that the error variance is "1.008034909 m" for the code phase calculated from the high sensitivity-type signal, "0.900690834 m" for the code phase calculated from the high accuracy-type signal, and "0.877745623 m" for the average code phase calculated from the high sensitivity-type signal and the high accuracy-type signal and therefore the average code phase calculated according to the technique of this embodiment has the smallest error variance.

Figure 10:
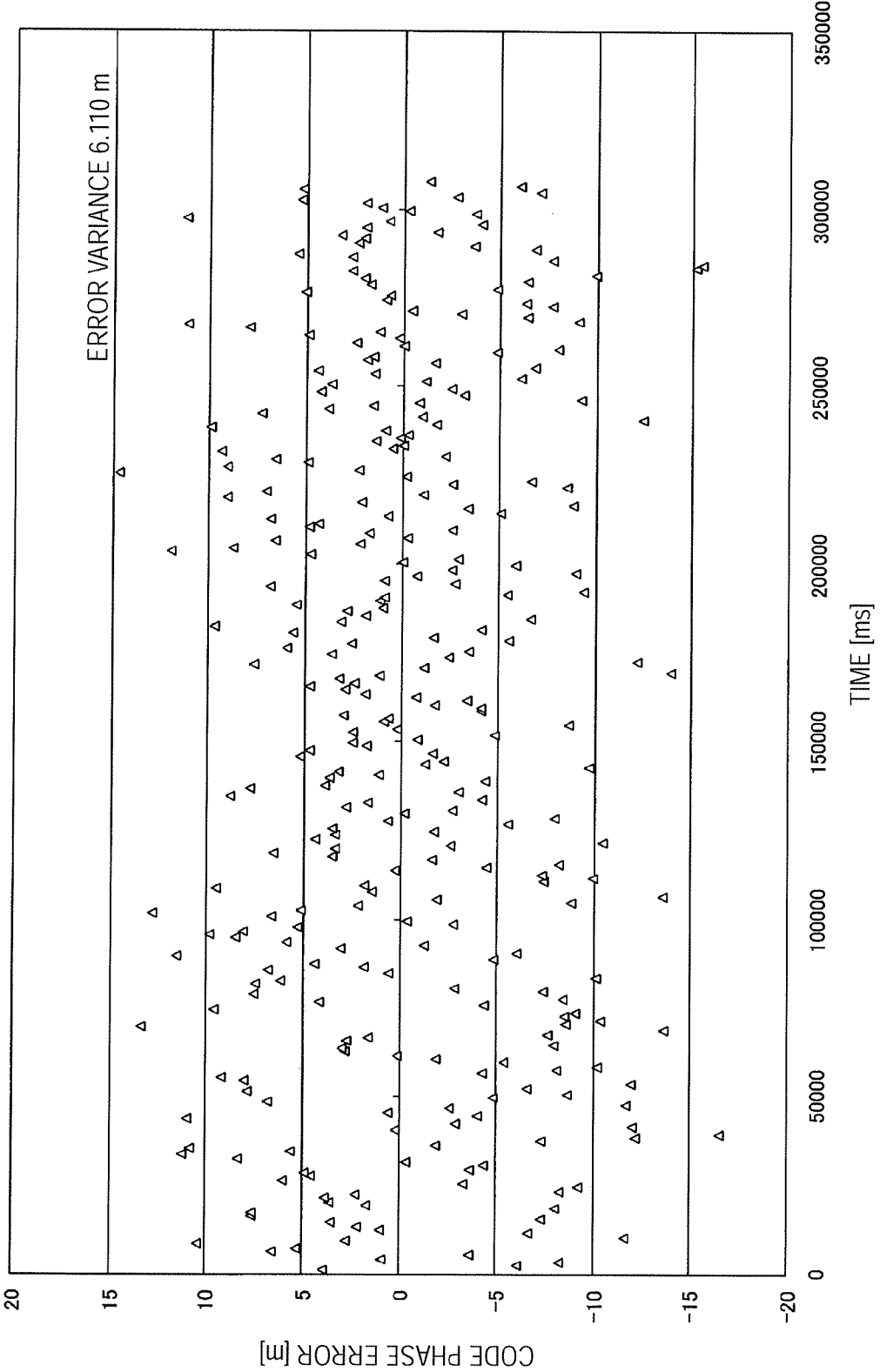
FIG. 10 shows an exemplary result of experiment in a weak electric field environment.
Figure 11:
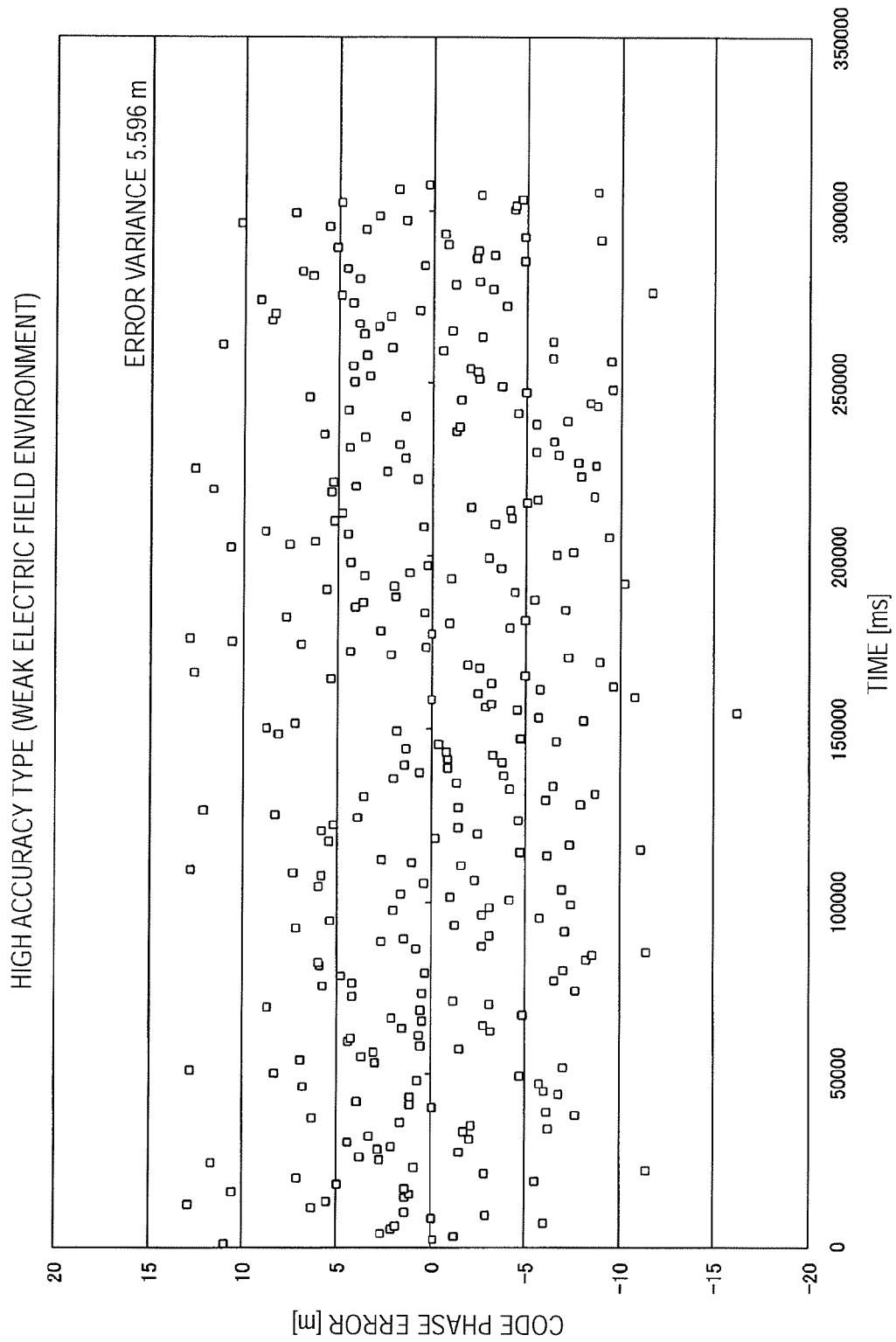
FIG. 11 shows an exemplary result of experiment in a weak electric field environment.
Figure 12:
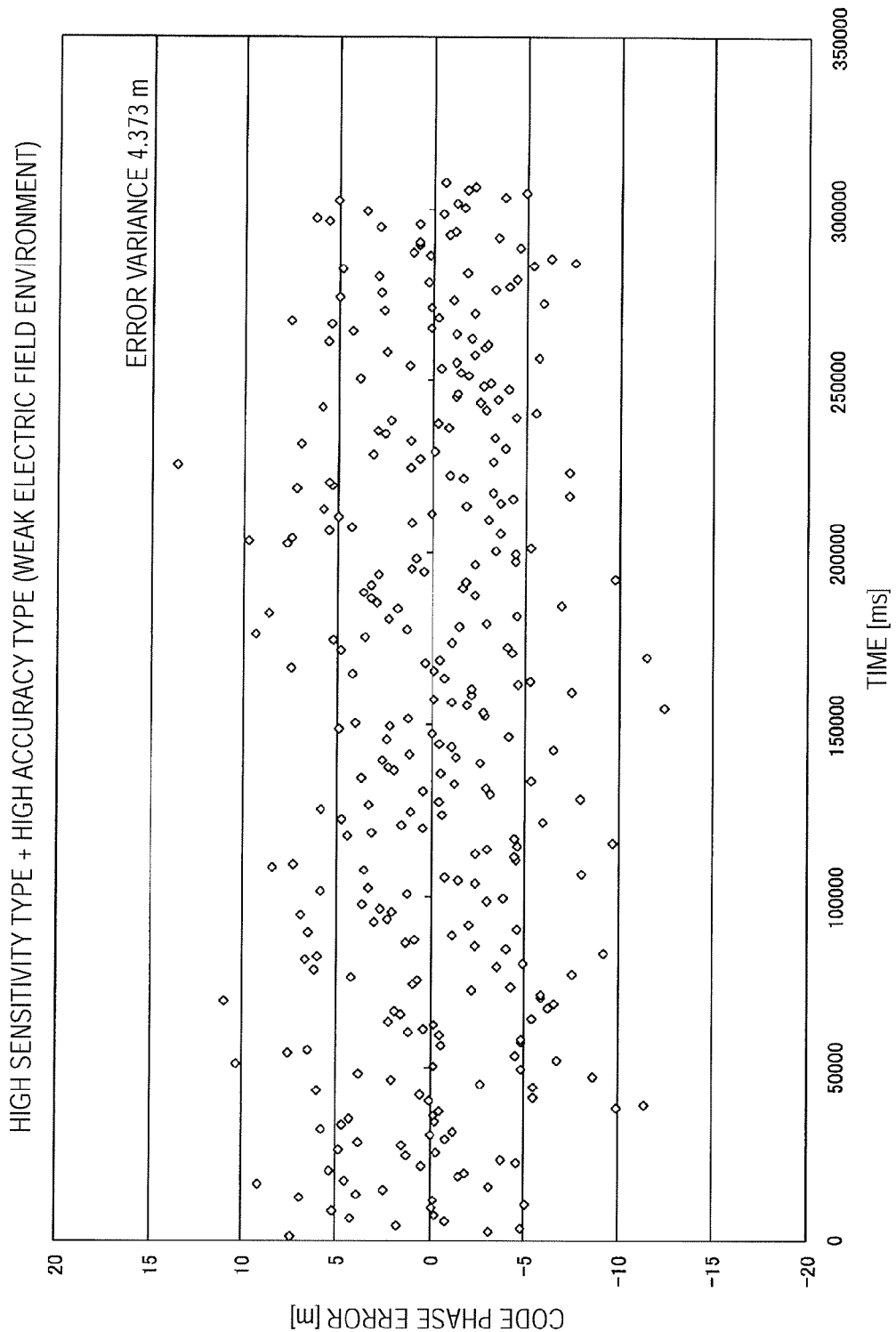
FIG. 12 shows an exemplary result of experiment in a weak electric field environment.

FIG. 10 to FIG. 12 show exemplary results of experiments in an environment where a received GPS satellite signal is a signal of a weak electric field (hereinafter referred to as "weak electric field environment") such as an indoor environment. Again, FIG. 10 to FIG. 12 show graphs plotting the magnitude of an error in measured value of a code phase where the horizontal axis represents the lapse of time for measurement and where one particular GPS satellite is focused on and the true value of the code phase of a GPS satellite signal received from this GPS satellite is used as a reference.

In the weak electric field environment, similarly to the case of the strong electric field environment, it can be understood that the distribution of errors in the average code phase calculated according to the technique of this embodiment is concentrated around the error "0". It can also be seen that the error variance is "6.110 m" for the code phase calculated from the high sensitivity-type signal, "5.596 m" for the code phase calculated from the high accuracy-type signal, and "4.373 m" for the average code phase calculated from the high sensitivity-type signal and the high accuracy-type signal and therefore the average code phase calculated according to the technique of this embodiment has the smallest error variance.

The inventor of this application actually calculated the pseudorange from the average code phase calculated according to the technique of this embodiment for each of the strong electric field environment and the weak electric field environment, carried out positioning operation, and measured the positioning error. As a result, it is confirmed that the positioning error is lowered and the positioning accuracy is improved, compared with the traditional technique.

Figure 13:
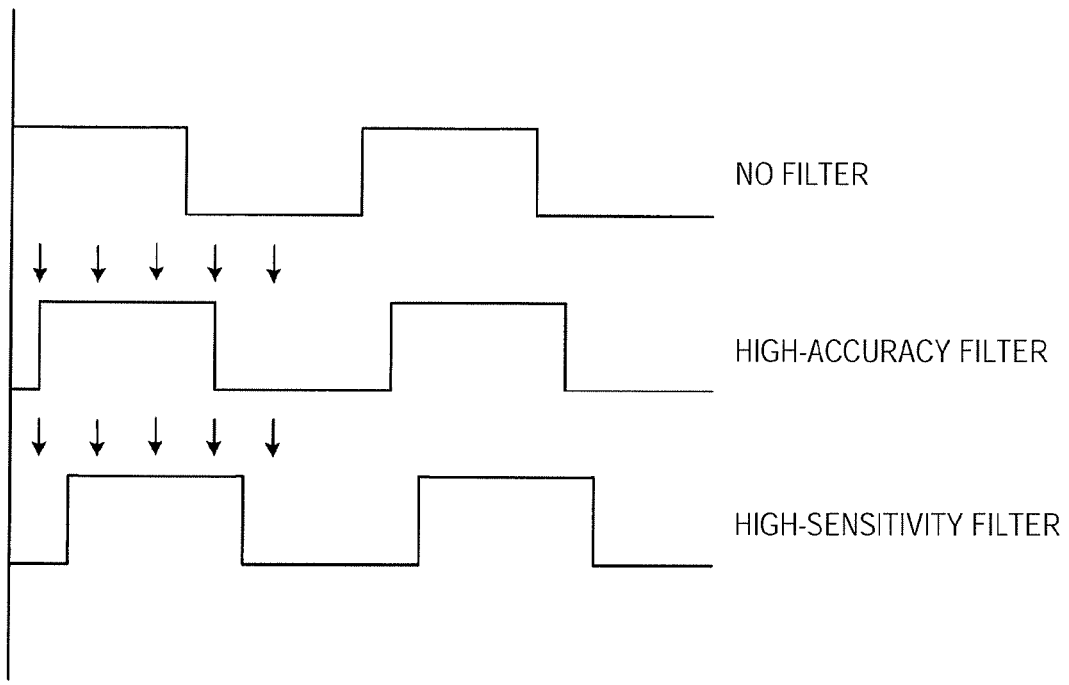
FIG. 13 is an explanatory view showing the principle of positioning accuracy improvement.

The reason why such experiment results are obtained can be found in the fact that a phase lag is generated in signals passed through the filters of the filter unit 13 because of the phase characteristic of the filters, as shown in FIG. 13. More specifically, because of the difference in the pass band between the high-sensitivity filter 131 and the high-accuracy filter 133, a greater phase lag is generated in the signal passed through the high-sensitivity filter 131 than the signal passed through the high-accuracy filter 133.

The signals passed through the filter unit 13 are sampled with a predetermined sampling frequency (sampling rate) and stored in the memory unit 15. However, there is a phase shift between the signal passed through the high-sensitivity filter 131 and the signal passed through the high-accuracy filter 133. Therefore, since the sampled part of the signal differs though the same sampling frequency (sampling rate) is used, two independent sampling data are acquired which appear to have been sampled in different timings.

In this embodiment, since the pseudorange is calculated by using these two independent sampling data, there can be an effect equivalent to calculating the pseudorange by sampling a received signal with a doubled sampling frequency. This enhances the accuracy of the pseudorange and hence raises the accuracy of the measured position acquired by positioning operation using this pseudorange. Therefore, the positioning accuracy is improved.

5. Effects and Advantages

According to this embodiment, a received signal of a GPS satellite signal sent from a GPS satellite is passed through each of the high-sensitivity filter 131 and the high-accuracy filter 133 having different phase characteristics. Then, a code phase is calculated from each signal passed through each filter and predetermined averaging is carried out on the basis of the calculated two code phases, thus calculating an average code phase. Then, a pseudorange to be used for positioning operation is calculated on the basis of the calculated average code phase.

A phase lag is generated in the received signal passed through the filters because of the phase characteristics of the filters. Therefore, by passing the received signal through plural filters having different phase characteristics, it is possible to acquire plural signals having a phase shift. As these plural signals are sampled with a predetermined sampling frequency, plural sampling data which appear to have been sampled in different timings can be obtained because of the phase shift. By calculating a pseudorange using these sampling data, it is possible to achieve an effect equivalent to sampling with an increased sampling frequency, and therefore to acquire a highly accurate pseudorange. As the pseudorange thus obtained is used to carry out positioning operation, the positioning accuracy is improved.

6. Modifications

6-1. Electronic Device

In the above embodiment, a portable telephone unit is used as an exemplary electronic device equipped with a positioning device. However, electronic devices to which the invention can be applied are not limited to this. For example, the invention can also be applied to electronic devices such as laptop personal computers, PDAs (personal digital assistants) and car navigation systems which are equipped with a positioning device.

6-2. Satellite Positioning System

In the embodiment, the invention is applied to the GPS as an exemplary satellite positioning system. However, the invention may also be applied to other satellite positioning systems such as WAAS (Wide Area Augmentation System), QZSS (Quasi Zenith Satellite System), GLONASS (GLObal NAvigation Satellite System), and GALILEO.

6-3. Division of Processing

The host CPU 30 may handle a part or all of the processing to be carried out by the CPU 21. For example, the CPU 21 calculates a pseudorange for each capture satellite and outputs the pseudorange to the host CPU 30. The host CPU 30 then carries out predetermined positioning operation using the pseudorange inputted from the CPU 21, thus measures the current position, and causes the display unit 50 to display the measured position.

6-4. Measurement Acquisition Operation Unit

In the embodiment, the CPU 21 carries out correlation operation and thus realizes acquisition of measurement information by software. However, a measurement acquisition operation unit as a circuit unit which acquires measurement information may be separately provided in the baseband processing circuit unit 20, and the acquisition of measurement information may be realized by hardware. In this case, the CPU 21 calculates an average value of code phases acquired by the measurement acquisition operation unit for the high sensitivity-type signal and the high accuracy-type signal, respectively, and calculates a pseudorange to be used for positioning operation on the basis of the calculated average code phase.

6-5. Filter

In the embodiment, the filter unit 13 includes the two filters, that is, the high-sensitivity filter 131 and the high-accuracy filter 133. However, the filter unit 13 may include three or more filters having different pass bands. Of course, in such cases, memories corresponding to their respective filters are prepared.

The filters constituting the filter unit 13 need not always be low-pass filters and can be band pass filters if their pass bands are inclusive. Moreover, the filters need not necessarily be digital filters and can be analog filters. In this case, a signal before being converted to a digital signal must be passed through the filters. Therefore, a filter unit including plural analog filters can be arranged, for example, before the A/D converter unit in the RF receiving circuit unit 11.

6-6. Calculation of Pseudorange

In the embodiment, the code phase calculated for the high accuracy-type signal and the code phase calculated for the high sensitivity-type signal are averaged to calculate the average code phase, and a pseudorange is calculated from the average code phase. However, the following calculation may be employed depending on the embodiment to apply. That is, a first pseudorange is calculated from the code phase calculated for the high accuracy-type signal, and a second pseudorange is calculated from the code phase calculated for the high sensitivity-type signal. Then, the first pseudorange and the second pseudorange are averaged to calculate the pseudorange to be used for positioning operation.

6-7. Averaging of Code Phases

In the embodiment, the arithmetic mean is used to calculate the average code phase. However, other averaging operations may be used as well. For example, a variable weight may be set on each code phase and weighted average operation may be carried out to calculate the average code phase.

Specifically, the average code phase "CP" is calculated in accordance with the following equation (2), where "$CP_A$" represents the code phase calculated from the high accuracy-type signal, "$CP_S$" represents the code phase calculated from the high sensitivity-type signal, and "$\Delta CP$" represents the offset of the code phase.

$$CP = (k_A \times CP_A + k_S \times (CP_S - \Delta CP))/(k_A + k_S) \qquad (2)$$

In this equation, "$k_A$" represents the weight of the code phase "$CP_A$" and "$k_S$" represents the weight of the code phase "$CP_S$".

Figure 14:
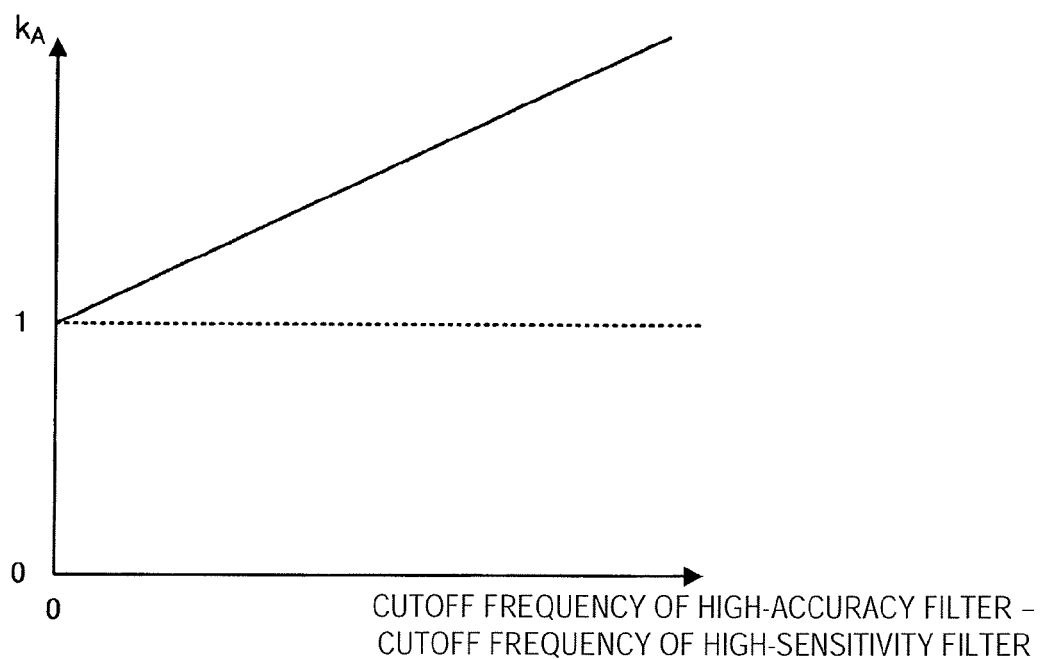
FIG. 14 is a graph showing the weight set for a code phase acquired from a high accuracy-type signal.

As a method of setting the weight, for example, it is possible to set the weight "$k_S=1$" and carry out averaging by increasing the weight "$k_A$" as the difference between the cutoff frequency of the high-accuracy filter and the cutoff frequency of the high-sensitivity filter increases. The graph showing the weight "$k_A$" in this case can be expressed by a linear function where "$k_A$ is equal to 1" if "the cutoff frequency of the high-accuracy filter minus the cutoff frequency of the high-sensitivity filter is 0", and $k_A$ linearly increases as the cutoff frequency of the high-accuracy filter minus the cutoff frequency of the high-sensitivity filter increases, for example, as shown in FIG. 14. Other functions (for example, exponential functions) may also be used as long as the weight gradually increases as the difference in the cutoff frequency increases.

In such cases, the greater the difference in width between the pass band of the high-accuracy filter and the pass band of the high-sensitivity filter is, the greater value the weight "$k_A$" of the code phase "$CP_A$" is set at. Therefore, the pseudorange to be used for positioning operation is calculated by emphasizing positioning accuracy rather than reception sensitivity.

In the case of calculating the pseudorange by using the method described in "6-6. Calculation of Pseudorange", weighted average operation can be carried out by setting "$k_A$" as the weight of the first pseudorange and "$k_S$" as the weight of the second pseudorange. The pseudorange can thus be calculated.

6-8. Setting of Pass Band of Filter and Averaging of Code Phases

A variable-frequency filter may be used as each filter constituting the filter unit. Then, in accordance with the reception environment of satellite signals and which of positioning accuracy and reception sensitivity should be emphasized (prioritized), the pass band of each filter may be set variably, and the weight of the code phase obtained for the signal passed through each filter may be variably set in accordance with the relative difference in pass band between the filters.

Figure 15:
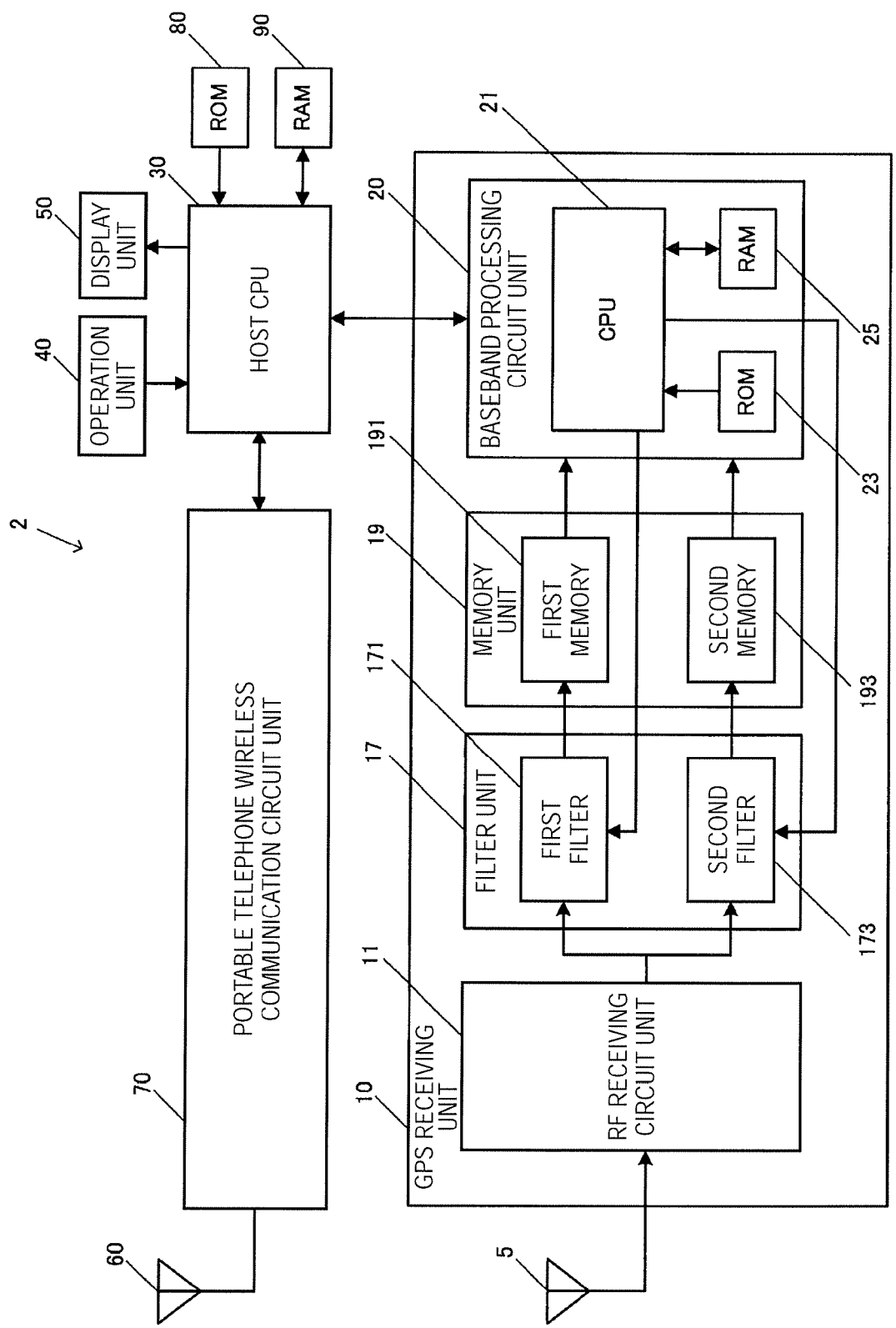
FIG. 15 is a block diagram showing the functional configuration of a portable telephone unit in a modification.

FIG. 15 is a block diagram showing the functional configuration of a portable telephone unit 2 in this case. In the GPS receiving unit 10 of the portable telephone unit 2, a filter unit 17 including a first filter 171 and a second filter 173 as variable-frequency filters, and a memory unit 19 including a first memory 191 and a second memory 193 are provided after the RF receiving circuit unit 11. The cutoff frequencies (pass bands) of the first filter 171 and the second filter 173 can be variably set in accordance with a signal from the CPU 21.

FIG. 16 is a graph showing the relation between the application of each filter constituting the filter unit 17, the weight of the code phase acquired for the signal passed through each filter, and the offset of the code phase. The average code phase "CP" is calculated in accordance with the following equation (3), where "$CP_1$" represents the code phase calculated by correlation operation with respect to sampling data stored in the first memory 191, "$CP_2$" represents the code phase calculated by correlation operation with respect to sampling data stored in the second memory 193, and "$\Delta CP$" represents the offset of the code phase.

$$CP=(k_1 \times CP_1 + k_2 \times (CP_2 - \Delta CP))/(k_1 + k_2) \qquad (3)$$

In this equation, "$k_1$" represents the weight of the code phase "$CP_1$" and "$k_2$" represents the weight of the code phase "$CP_2$".

For example, if both the first filter 171 and the second filter 173 are high-sensitivity filters, weighted average operation is carried out by setting "$k_1$=b1", "$k_2$=b2" and "$\Delta CP=\Delta CP$2", and the average code phase is thus calculated. Meanwhile, if the first filter 171 is a supersensitivity filter and the second filter 173 is a superhigh-accuracy filter, weighted average operation is carried out by setting "$k_1$=d1", "$k_2$=d2" and "$\Delta CP=\Delta CP$4", and the average code phase is thus calculated. Specific numerical values of weight can be properly set.

What is claimed is:

1. A pseudorange calculation method for calculating a pseudorange in a position calculation device comprising:
   passing a received signal received from a satellite for position calculation through a first filter;
   passing the received signal through a second filter having a different phase characteristic from that of the first filter;
   calculating a first pseudorange on the basis of a signal acquired by passing through the first filter;
   calculating a second pseudorange on the basis of a signal acquired by passing through the second filter; and
   calculating a third pseudorange to be used for position calculation, on the basis of the first pseudorange and the second pseudorange.

2. The pseudorange calculation method according to claim 1, wherein a pass band of the first filter includes a pass band of the second filter.

3. The pseudorange calculation method according to claim 1, wherein calculating the third pseudorange includes changing a weight of the first pseudorange and a weight of the second pseudorange on the basis of a difference between a pass band of the first filter and a pass band of the second filter, and carrying out weighted average operation of the first pseudorange and the second pseudorange.

4. The pseudorange calculation method according to claim 3, wherein calculating the third pseudorange includes changing the weight of the first pseudorange and the weight of the second pseudorange in such a manner that the weight of the first pseudorange becomes greater than the weight of the second pseudorange as the difference between the pass band of the first filter and the pass band of the second filter becomes greater.

5. The pseudorange calculation method according to claim 1, further comprising variably setting pass bands of the first filter and the second filter.

6. A position calculation method for carrying out position calculation using a pseudorange calculated by the pseudorange calculation method according to claim 1.

7. A position calculation device comprising:
   a receiving unit which receives a position calculation signal from a satellite for position calculation;
   a first filter which passes a signal having a first frequency band of the received signal;
   a second filter which has a different phase characteristic from that of the first filter and passes a signal having a second frequency band of the received signal;
   a calculation unit which calculates a third pseudorange on the basis of a first pseudorange calculated on the basis of a signal acquired by passing through the first filter and a second pseudorange calculated on the basis of a signal acquired by passing through the second filter; and
   a position calculation unit which executes position calculation using the third pseudorange.

* * * * *